United States Patent
Kim

(10) Patent No.: US 8,852,789 B2
(45) Date of Patent: Oct. 7, 2014

(54) BATTERY MODULE HAVING BATTERY CELL HOLDER

(75) Inventor: Myung-Chul Kim, Yongin-si (KR)

(73) Assignees: Samsung SDI Co., Ltd., Yongin-Si, Gyeonggi-Do (KR); Robert Bosch GmbH, Stuttgart (DE)

(*) Notice: Subject to any disclaimer, the term of this patent is extended or adjusted under 35 U.S.C. 154(b) by 354 days.

(21) Appl. No.: 13/241,522

(22) Filed: Sep. 23, 2011

(65) Prior Publication Data

US 2012/0115011 A1    May 10, 2012

Related U.S. Application Data

(60) Provisional application No. 61/449,414, filed on Mar. 4, 2011, provisional application No. 61/452,046, filed on Mar. 11, 2011.

(30) Foreign Application Priority Data

| Nov. 4, 2010 | (KR) | .......................... 10-2010-0109179 |
| Nov. 4, 2010 | (KR) | .......................... 10-2010-0109180 |
| Nov. 4, 2010 | (KR) | .......................... 10-2010-0109181 |
| Nov. 4, 2010 | (KR) | .......................... 10-2010-0109182 |

(51) Int. Cl.
| *H01M 2/10*    | (2006.01) |
| *H01M 10/50*   | (2006.01) |
| *H01M 10/625*  | (2014.01) |
| *H01M 10/647*  | (2014.01) |
| *H01M 2/20*    | (2006.01) |
| *H01M 10/6562* | (2014.01) |
| *H01M 10/613*  | (2014.01) |

(52) U.S. Cl.
CPC ........ *H01M 2/1077* (2013.01); *H01M 10/5016* (2013.01); *Y02E 60/12* (2013.01); *H01M 10/5032* (2013.01); *H01M 2/206* (2013.01); *H01M 10/5065* (2013.01); *H01M 10/5004* (2013.01)
USPC ............................ 429/156; 429/120; 429/159

(58) Field of Classification Search
None
See application file for complete search history.

(56) References Cited

U.S. PATENT DOCUMENTS

| 5,436,089 A  | 7/1995 | Fedele |
| 6,790,544 B2 | 9/2004 | Schmitz |

(Continued)

FOREIGN PATENT DOCUMENTS

| KR | 10-1999-0018295 A | 3/1999 |
| KR | 20060099216 A | 9/2006 |

(Continued)

OTHER PUBLICATIONS

USPTO Rejection dated Nov. 6, 2013 for U.S. Appl. No. 13/243,355.

(Continued)

*Primary Examiner* — Jonathan Crepeau
(74) *Attorney, Agent, or Firm* — Lee & Morse, P.C.

(57) ABSTRACT

A battery module includes a first set of battery cells stacked in a first direction and a second set of battery cells stacked in the first direction, and the first and second sets of battery cells are arranged in a second direction and face in opposed directions relative to each other. The battery module also includes at least one battery cell holder between adjacent battery cells in at least one of the first and second sets of battery cells stacked in the first direction. The battery cell holder includes an insulating plate between the adjacent battery cells in the at least one of the first and second sets of battery cells stacked in the first direction, and a plurality of guides protruding from edges of the insulating plate to extend in the first direction over the adjacent battery cells in overhanging relationship therewith.

16 Claims, 8 Drawing Sheets

(56) References Cited

U.S. PATENT DOCUMENTS

| | | |
|---|---|---|
| 7,332,244 B2 | 2/2008 | Uemoto et al. |
| 7,820,322 B2 | 10/2010 | Jung et al. |
| 8,039,141 B2 | 10/2011 | Jeon et al. |
| 2004/0013936 A1 | 1/2004 | Barrett, Jr. |
| 2005/0202315 A1* | 9/2005 | Sugeno et al. ............... 429/156 |
| 2006/0073375 A1 | 4/2006 | Hong et al. |
| 2006/0093899 A1 | 5/2006 | Jeon et al. |
| 2006/0115719 A1 | 6/2006 | Jeon et al. |
| 2006/0115726 A1 | 6/2006 | Jung et al. |
| 2006/0216579 A1 | 9/2006 | Cho |
| 2007/0020516 A1 | 1/2007 | Yoon |
| 2007/0134524 A1 | 6/2007 | Cho et al. |
| 2009/0061301 A1* | 3/2009 | Planck ......................... 429/160 |
| 2010/0047682 A1 | 2/2010 | Houchin-Miller et al. |
| 2010/0173181 A1 | 7/2010 | Okada et al. |
| 2011/0151299 A1 | 6/2011 | Park et al. |
| 2011/0151311 A1 | 6/2011 | Lee et al. |
| 2011/0318625 A1 | 12/2011 | Yajima et al. |
| 2012/0115011 A1 | 5/2012 | Kim |

FOREIGN PATENT DOCUMENTS

| | | |
|---|---|---|
| KR | 20060102852 A | 9/2006 |
| KR | 10-2006-0116424 A | 11/2006 |
| KR | 10-2006-0131320 A | 12/2006 |
| KR | 10-0709261 B1 | 4/2007 |
| KR | 20070068608 A | 7/2007 |
| KR | 10-2008-0042965 A | 5/2008 |
| WO | WO-2007-011144 A1 | 1/2007 |
| WO | WO-2008-027343 A1 | 3/2008 |

OTHER PUBLICATIONS

Office Action mailed Apr. 15, 2014 in corresponding European Patent Application No. 11187704.9.

Office Action mailed Feb. 17, 2014 in corresponding European Patent Application No. 11187693.4.

\* cited by examiner

BATTERY MODULE HAVING BATTERY CELL HOLDER

REFERENCE TO RELATED APPLICATIONS

Korean Patent Application No. 10-2010-0109179, filed on Nov. 4, 2010, Korean Patent Application No. 10-2010-0109180, filed on Nov. 4, 2010, Korean Patent Application No. 10-2010-0109181, filed on Nov. 4, 2010, and Korean Patent Application No. 10-2010-0109182, filed on Nov. 4, 2010, in the Korean Intellectual Property Office, are incorporated by reference herein in their entirety. The present application also claims priority under 35 U.S.C. §119(e) to U.S. Provisional Application No. 61/449,414, filed on Mar. 4, 2011, and U.S. Provisional Application No. 61/452,046, filed on Mar. 11, 2011, which are incorporated herein by reference in their entirety.

BACKGROUND

Secondary batteries may be reused by charging and discharging. The secondary batteries may be used as, e.g., energy sources for mobile devices, electric vehicles, hybrid vehicles, electric bicycles, and uninterruptible power supplies. Secondary batteries may be used in a single battery type or a battery module type composed of a plurality of batteries connected in one unit, in accordance with the application of the secondary batteries in various kinds of external devices.

SUMMARY

Embodiments may be realized by providing a battery module that includes a first set of battery cells stacked in a first direction and a second set of battery cells stacked in the first direction, and the first and second sets of battery cells are arranged in a second direction and face in opposed directions relative to each other. The battery module also includes at least one battery cell holder between adjacent battery cells in at least one of the first and second sets of battery cells stacked in the first direction. The battery cell holder includes an insulating plate between the adjacent battery cells in the at least one of the first and second sets of battery cells stacked in the first direction, and a plurality of guides protruding from edges of the insulating plate to extend in the first direction over the adjacent battery cells in overhanging relationship therewith.

The insulating plate may be arranged in a plane coincident with the second direction. The insulating plate with the guides thereon may have an overall rectangular shape for co-operation with prismatic battery cells.

In the at least one of the first and second sets of battery cells, a first surface of the insulating plate may be adjacent to one battery cell and a second surface of the insulating plate may be adjacent to another battery cell. The first surface and the second surface of the insulating plate may be parallel to the second direction, and the plurality of guides may protrude in the first direction intersecting the second direction.

The insulating plate may include a plurality of protrusions. In the at least one of the first and second sets of battery cells, the plurality of protrusions may include upper protrusions facing a first surface of one adjacent battery cell and lower protrusions facing a second surface of another adjacent battery cell. The upper protrusions and the lower protrusions may be arranged in a zigzag pattern such that the upper protrusions are in a non-overlapping relationship with the lower protrusions.

In the at least one of the first and second sets of battery cells, the upper protrusions may contact the first surface of the one adjacent battery cell and the lower protrusions may contact the second surface of the other adjacent battery cell.

In the battery cell holder, the insulating plate may include a metal plate, the upper and lower protrusions may include a metal, and insulating layers may cover the metal plate, the upper protrusions, and the lower protrusions.

The plurality of guides may substantially completely surround the insulating plate. Each guide of the plurality of guides may include a plurality of slots that expose sides of the adjacent battery cells. Slots of the plurality of slots may be spaced apart on each guide. The plurality of guides may include an insulating material. One guide of the plurality of guides may extend over terminal surfaces of the adjacent battery cells and may have a lesser height than other guides of the plurality of guides. The insulating plate may have a plurality of corners, and the plurality of guides may be spaced apart on the corners of the insulating plate.

The at least one battery cell holder may include a first battery cell holder between the adjacent battery cells in the first set of battery cells and a second battery cell holder between the adjacent battery cells in the second set of battery cells. One guide in each of the battery cell holders in the first and second sets of battery cells, respectively, may be in abutting contact with each other.

BRIEF DESCRIPTION OF THE DRAWINGS

Features and advantages will become apparent to those of ordinary skill in the art by describing in detail exemplary embodiments with reference to the attached drawings, in which.

DETAILED DESCRIPTION

Figure 1:
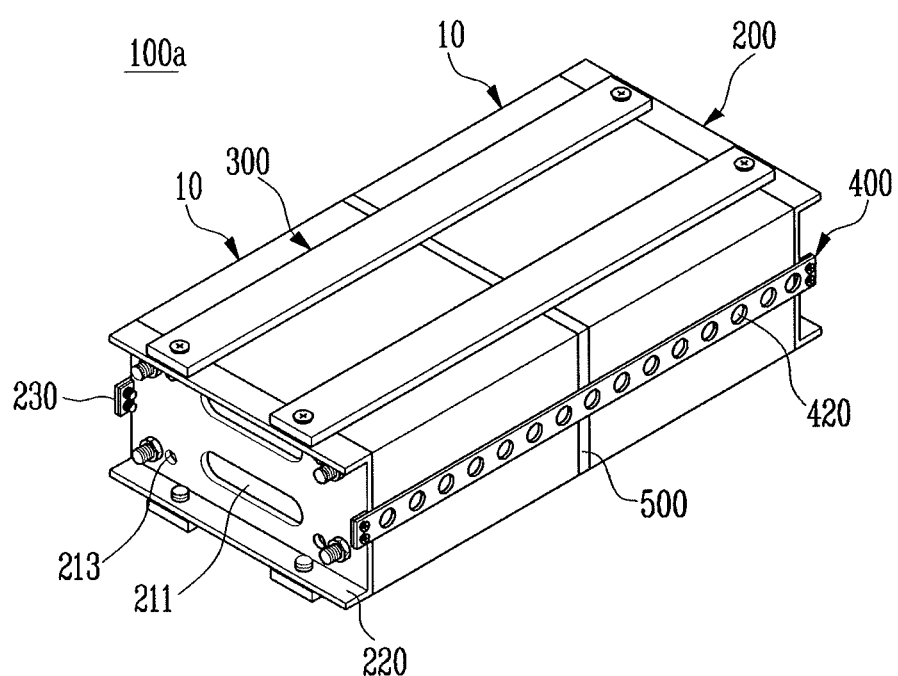
FIG. 1 illustrates a perspective view showing an example of a battery module, according to exemplary embodiment.

Example embodiments will now be described more fully hereinafter with reference to the accompanying drawings; however, they may be embodied in different forms and should not be construed as limited to the embodiments set forth herein. Rather, these embodiments are provided so that this disclosure will be thorough and complete, and will fully convey the scope of the invention to those skilled in the art.

In the drawing figures, the dimensions of layers, elements, and regions may be exaggerated for clarity of illustration. It will also be understood that when an element is referred to as being "on" another element, it can be directly on the other element, or intervening elements may also be present. Further, it will also be understood that when an element is referred to as being "between" two elements, it can be the only element between the two elements, or one or more intervening elements may also be present. Like reference numerals refer to like elements throughout.

The terms representing directions, such as "upper and lower" used herein are considered to be based on the status shown in the drawings, if not specifically defined or stated. The arrangement of battery cells and the stacked structure are defined as a battery array hereafter.

Figure 2:
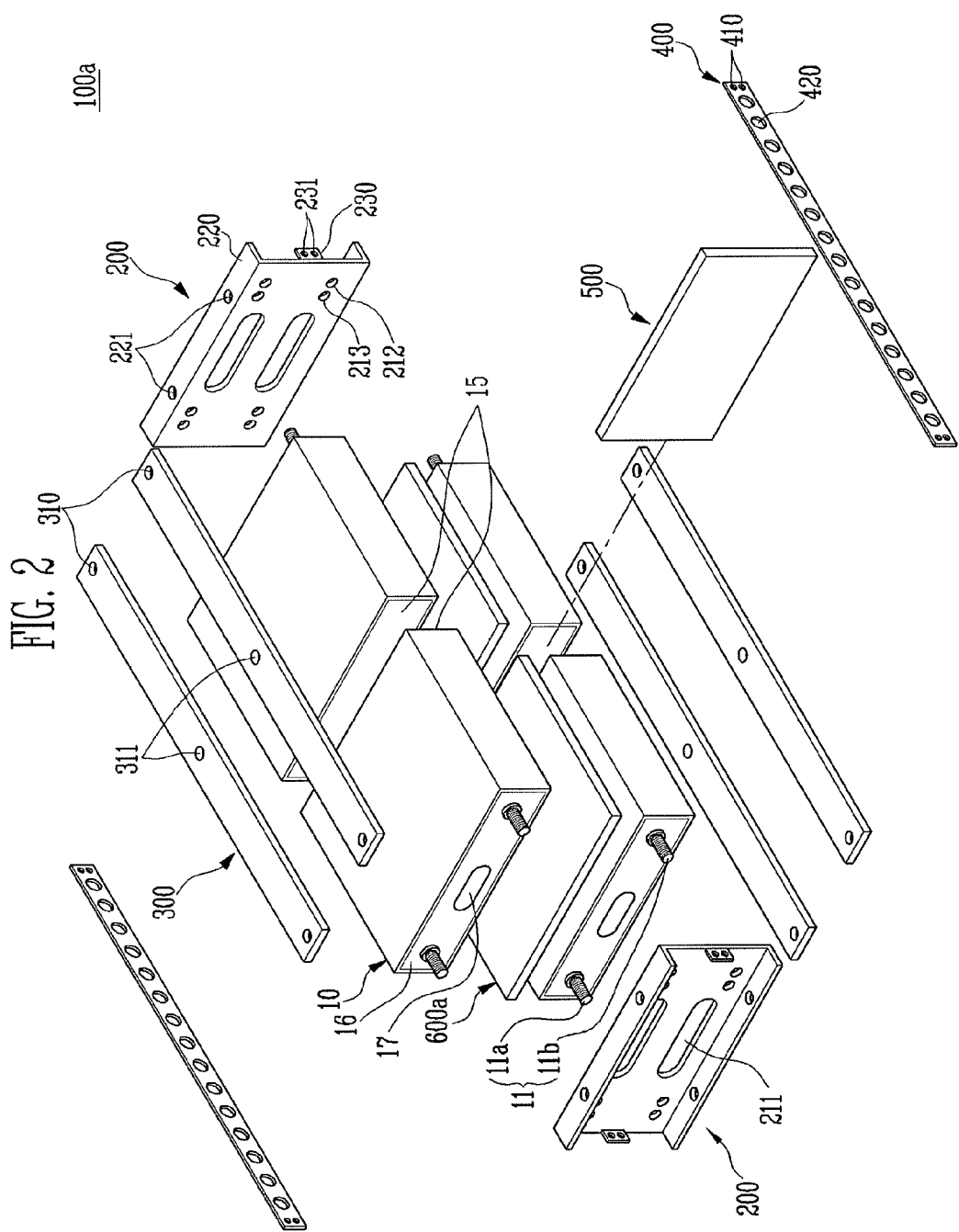
FIG. 2 illustrates an exploded perspective view of the battery module shown in FIG. 1.

A battery module 100a, according to an exemplary embodiment, is described with reference to FIGS. 1 and 2. FIG. 1 illustrates a perspective view showing an example of a transverse type of battery module, and FIG. 2 illustrates an exploded perspective view of the battery module shown in FIG. 1.

Exemplary embodiments may be applied to the transverse type of battery module 100a shown in FIG. 1. For example, the transverse type of battery module 100a may include a plurality of battery cells 10 making a battery array, a configuration for insulating, and a configuration for fixing.

The battery cells 10, according to an exemplary embodiment, may be formed in hexahedral shapes and/or prismatic shapes. However, embodiments are not limited thereto, and the battery cells 10 may have various shapes including, but not limited to, other polyhedral shapes. The battery cells 10 may include a terminal surface 16 that is provided with electrode terminals 11, e.g., a cathode terminal 11a and an anode terminal 11b, and a vent 17. The vent 17 may be formed at, e.g., the center of the terminal surface 16. The vent 17 may allow a gas produced in the battery cell 10 to be discharged therethrough. The electrode terminals 11 may be formed at both sides of the vent 17. For example, the cathode terminal 11a may be formed on one end of the terminal surface 16, the anode terminal 11b may be formed on an end of the terminal surface 16 opposing the end including the cathode terminal 11a, and the vent 17 may be disposed between the cathode terminal 11a and the anode terminal 11b. The electrode terminals 11 may function as paths allowing the current produced in the battery cell 10 to flow to the outside. A bottom 15 of the battery cell 10 may be the side of the battery cell 10 opposing the terminal surface 16, i.e., the opposing side to the terminal surface 16.

The battery cells 10 may be transversely disposed, e.g., in two adjacent stacks, in the battery module 100a, such that the bottoms 15 of two battery cells 10 face each other. The electrode terminals 11 of all the battery cells 10 may be disposed to face the outside of the battery module 100a.

According to an exemplary embodiment, the battery cells 10 may include pairs of battery cells 10, in which the bottoms 15 of battery cells 10 in each pair may face each other. The pair of battery cells 10 disposed as described above may be stacked in two layers or more, e.g., as illustrated in FIG. 2. For example, the battery cells 10 may be stacked such that the battery module 100a includes first and second sets of stacked battery cells 10. The electrode terminals 11 of the first and second sets of stacked battery cells 10 may have the same polarity or opposite polarities. For example, the battery cells 10 in the first stack may be arranged such that the cathode terminal 11a is on the same side or on an opposite side as the cathode terminals 11a in the second stack.

Referring to FIG. 2, the battery module 100a may include upper and lower layers of battery cells 10. For example, two opposite battery cells 10, e.g., the pair of battery cells 10, may be provided in one layer, but a single cell 10 may be stacked. The battery module 100a may include many layers, e.g., the upper and lower layers, of pairs of battery cells 10 that are stacked on each other. The electrode terminals 11 of the upper and lower layers of battery cells 10 may have the same polarity or opposite polarities. Further, exemplary embodiments include the number of stacked battery cells 10 being two or more, but embodiments are not limited thereto.

The array of battery cells 10 in the battery module 100a may include a plurality of sets of battery cells 10 extending in a first direction, e.g., forming the first and second sets of stacked battery cells 10. The array of battery cells 10 may further include the sets of battery cells 10 arranged in a second direction relative to each other, e.g., to form pairs of battery cells 10 on a same layer in the array of battery cells 10.

Fixing members may be provided to, e.g., fix the components inside the battery module 100a. The fixing members may include upper and lower fixing members 300, side fixing members 400, and end plates 200. The end plates 200 may be fastened to the terminal surfaces 16 of the battery cells 10 at both ends of the battery array such that the electrode terminals 11 and the vent hole 17 of each battery cell 10 are exposed to the outside through the end plates 200. For example, a first end plate 200 may be fastened to the terminal surfaces 16 of a first set of stacked battery cells 10, and a second end plate 200 may be fastened to the terminal surfaces 16 of a second set of stacked battery cells 10.

The end plates 200 may include at least one first opening 211 that exposes the vents 17 on the terminal surfaces 16 of the battery cells 10. The end plates 200 may include a plurality of second openings 212 that include the electrode terminals 11 extending therethrough to the outside of the battery module 100a. The end plates 200 may include third openings 213 that are adjacent to corresponding second openings 212. The end plates 200 may include a first extension portion 220 including openings 221 to, e.g., fix the end plates 200 to the upper and lower fixing members 300. The first extension portion 220 may extend along substantially an entire width of the end plate 200 or may extend along a portion of the end plate 200. The end plates 200 may include a second extension portion 230 including openings 231 to, e.g., fix the end plates 200 to the side fixing members 400. The second extension portion 230 may extend along a portion of the height of the end plate 200 or may extend along substantially an entire height of the end plate 200.

The upper and lower fixing members 300 may be disposed on the battery cells 10, e.g., each of the upper and lower fixing members 300 may be either above or under the battery cells 10 arranged in an array. For example, the upper and lower fixing members 300 may extend across the sets of stacked battery cells 10. The upper and lower fixing members 300 may each be fixed to one of the top or the bottom of the end plates 200 to, e.g., restrict vertical movement of the battery cells 10 in the array. For example, the upper and lower fixing members 300 may include first openings 310 that correspond to openings 221 in the first extension portions 220 of the end plates 200 for fixing the upper and lower fixing members 300 to the end plates 200. The upper and lower fixing members 300 may include a plurality of first openings 310 on opposing ends thereof, and may include second openings 311 between the first openings 310 on the opposing ends.

The side fixing members 400 may be disposed on the sides of the battery cells 10 arranged in the array. The side fixing members 400 may extend across the sets of stacked battery cells 10. The side fixing members 400 may be fixed to both sides of the end plates 200 to, e.g., restrict side movement of the battery array 10. The side fixing members 400 may include first openings 411 that correspond to openings 231 in the second extension portion 230 of the end plates 200 for fixing the side fixing members 400 to the end plates 200. The side fixing members 420 may include the first openings 410 on opposing ends thereof, and may include second openings 420 between the first openings 410 on the opposing ends.

A vertical insulating member 500 and a horizontal insulating member 600*a* may be provided as insulating members between battery cells 10 in the battery module 100*a*. The vertical insulating member 500 may be disposed between the bottoms 15 of two battery cells 10 for insulation, e.g., the vertical insulating member 500 may be disposed between two battery cells that form a pair of battery cells 10 arranged in the second direction on a same layer. The vertical insulating member 500 may extend in the first direction between two sets of stacked battery cells 10. The vertical insulating member 500 may extend between all the pairs of battery cells 10 arranged in the battery module 100*a*. The second openings 311 in the upper and lower fixing members 300 may correspond to the vertical insulating member 500.

The horizontal insulating member 600*a* may be disposed between two battery cells 10 stacked in the first direction for insulation. The horizontal insulating member 600*a* may be disposed in a direction substantially perpendicular to the vertical insulating member 500, e.g., the horizontal insulating members 600*a* may be arranged in a plane coincident with a second direction that intersects the first direction.

Exemplary embodiments relate to a configuration corresponding to the horizontal insulating member 600*a*. Exemplary battery cell holders are described with reference to FIGS. 3 and 4.

Figure 3:
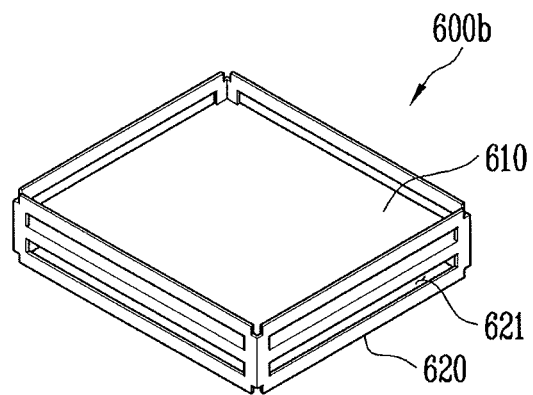
FIG. 3 illustrates a perspective view of a battery cell holder, according to an exemplary embodiment.

FIG. 3 illustrates a perspective view showing a battery cell holder 600*b* according to an exemplary embodiment. The battery cell holder 600*b* may include an insulating plate 610 and guides 620. The battery cell holder 600*b* may be made of an insulating material, such as plastic.

The insulating plate 610 may be formed in various shapes in accordance with the shape of a corresponding side of the battery cell 10, e.g., the insulating plate 610 may be formed in a quadrangle plate shape. The insulating plate 610 may be made of a plastic. The insulating plate 610 may include an aluminum plate and an insulating layer on the surface of the aluminum plate. The insulating plate 610 may be disposed between two battery cells 10 stacked in the first direction, e.g., the insulation plate may be between two battery cells 10 disposed in a stack. The insulating plate 610 may be arranged in a plane coincident with the second direction that intersects the first direction. The insulating plate 610 may function to insulate the battery cells 10.

The guides 620 may be disposed around the insulating plate 600*b*. The guides 620 may extend vertically in a predetermined length from the sides of the insulating plate 600*b*. The guides 620 may extend in the first direction, e.g., vertically, along the periphery of the insulating plate 610. The guides 620 may be made of a plastic. The guides 620 may be provided such that the battery cells 10 may be seated with small gaps. The guides 620 may overlap, e.g., in an overhanging relationship, sides of the battery cells 10 having the insulating plate 610 therebetween. The guides 620 may surround, e.g., substantially completely surround, the insulating plate 610 and the sides of the battery cells 10 having the insulating plate 610 therebetween. The guides 620 may have an overall rectangular shape for co-operation with prismatic battery cells 10. The guides 620 may be continuously formed to surround substantially an entire periphery of the insulating plate 610. The guides 620 may have gaps therebetween such that the guides 620 are excluded in regions along the periphery of the insulating plate 610.

The guides 620 may each have at least one slot 621. For example, the guides 620 may have a first slot that exposes a side of one of the battery cells 10 and a second slot that exposes a side of the other battery cell 10. The heat produced from the battery cells 10 may be easily discharged through the slots 621. The area of the guides 620 surrounding the slots 621 may be made of plastic, similar to the insulating plate 600*b*.

Figure 4:
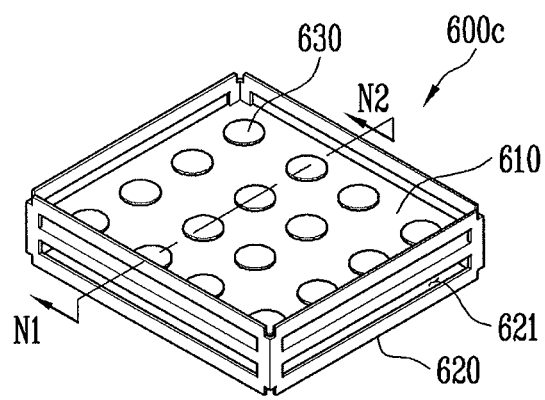
FIG. 4 illustrates a perspective view of a battery cell holder, according to an exemplary embodiment.
Figure 5A:
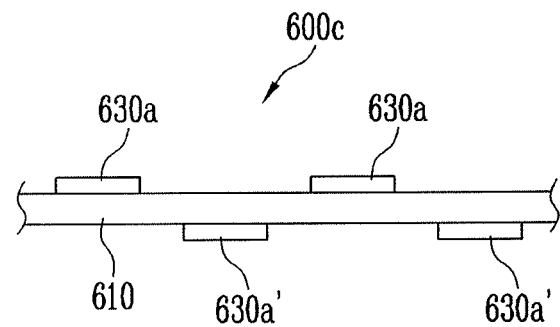
FIGS. 5A and 5B illustrate partial cross-sectional views of protrusions, according to exemplary embodiments.
Figure 5B:
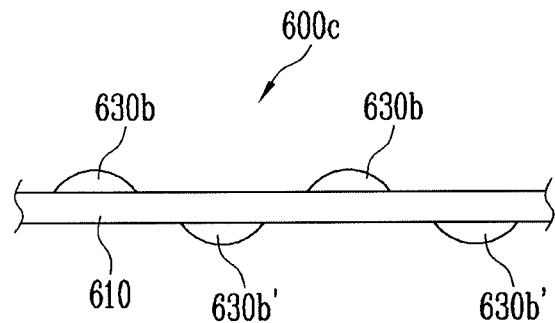

Protrusions are described with reference to FIGS. 4 to 5B. FIG. 4 illustrates a perspective view showing a battery cell holder according to another embodiment, and FIGS. 5A and 5B illustrate partial perspective views showing examples of protrusions. Protrusions 630 may be formed on both surfaces, e.g., on two opposing surfaces, of the insulating plate 610. The protrusions 630 may include upper protrusions 630 that face a first surface of one adjacent battery cell 10, and lower protrusions 630 that face a second surface of another adjacent battery cell 10. The upper protrusions 630 may contact, e.g., directly contact, the first surface of the one adjacent battery cell 10, and the lower protrusions 630 may contact, e.g., directly contact, the second surface of the other adjacent battery cell 10. The protrusions 630 may define predetermined spaces between the insulating plate 610 and the battery cells 10 adjacent to the protrusions 630.

The guides 620 may vertically extend along the sides of the insulating plate 610 in a direction that is substantially parallel to a protruding direction of the protrusions 630. The protrusions 630 on both surfaces of the insulating plate 610 may not be at the same positions in a vertical cross-section including a normal of the insulating plate 610.

The protrusions 630 may be in point contact with the adjacent battery cells 10, e.g., a point on the protrusions 630 may be in direct contact with the adjacent battery cells 10. Referring to FIG. 4, a plurality of protrusion 630 may be formed on two opposing surfaces, e.g., both the top and bottom surfaces, of the insulating plate 610 of a battery cell holder 600*c*. The protrusions 630 may have uniform thicknesses. The shape of the protrusions 630 is not limited. For example, exemplary shapes for the protrusions 630 include, but are not limited to, rectangular prism shapes, triangular prism shapes, or semispherical shapes. Referring to FIG. 5A, the protrusions 630*a* on one surface of the insulating plate 610 and the protrusions 630*a'* on the opposing surface of the insulating plate 610 may be formed in uniform thicknesses. For example, the protrusions 630*a* and 630*a'* may have a substantially same thickness throughout. Referring to FIG. 5B, the protrusions 630*b* and 630*b'* may be formed in point contact with battery cells 10 that has been seated on the insulating plate 610.

The protrusions 630 may not be at the same position on a vertical cross-section taken along line N1-N2 including a normal of the insulating plate 610, e.g., the protrusions 630 may be arranged in a zigzag pattern. That is, as shown in FIGS. 5A and 5B, the positions of the upper protrusions 630*a*, 630*b* and the positions of the lower protrusions 630*a'*, 630*b'* may be in non-overlapping relationships, e.g., may not overlap each other, in any vertical cross-sections of the insulating plate 610. When the upper protrusions 630*a*, 630*b* and the lower protrusions 630*a'*, 630*b'* overlap each other, the heat produced from the battery cells 10 may locally concentrate and may causes heat points.

Figure 6:
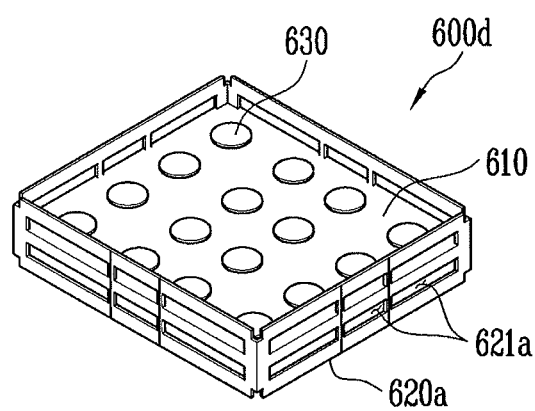
FIG. 6 illustrates a perspective view of a battery cell holder, according to an exemplary embodiment.

A cell holder that may have an anti-torsion function is described with reference to FIG. 6. FIG. 6 illustrates a perspective view showing a battery cell holder 600d according to an exemplary embodiment.

Slots 621a may be discontinuously formed on at least one side of the guides 620 to, e.g., discharge heat. Referring to FIG. 3, the slots 621a may be formed in the guides 620 extending along the battery cells 10 and the slots 621a may expose sides of the battery cells 10. In the embodiment of slots 621a illustrated in FIG. 3, the guides 620 may be bent or deformed by heat or external shock. Referring to FIG. 6, the slots 621a may be discontinuously formed at several positions along the guides 620 in the battery cell holder 600d. For example, the slots 621a may be formed extending in a second direction that intersects the first direction in which the guide 620 extends to overhang the battery cell 10, e.g., the slots 621a may be formed in the longitudinal directions of the guides 620. When the slots 621a are discontinuously formed in several positions, e.g., as illustrated in FIG. 6, a thermal resistance of durability may be increased.

Figure 7:
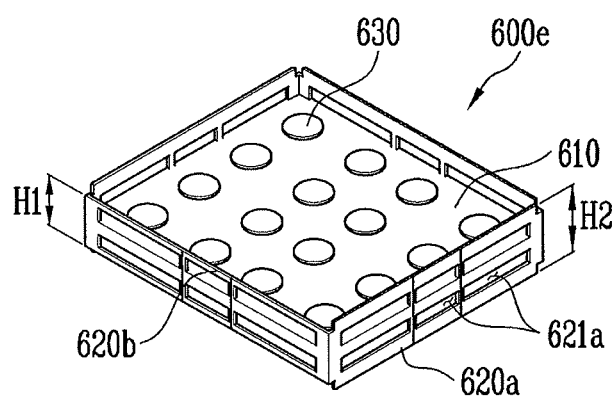
FIG. 7 illustrates a perspective view of a battery cell holder, according to an exemplary embodiment.
Figure 8:
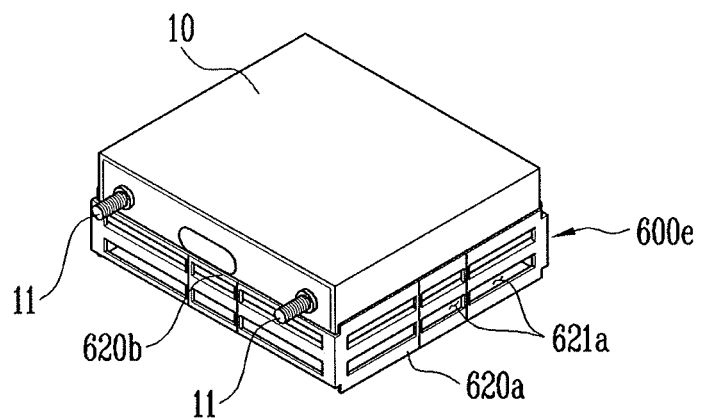
FIG. 8 illustrates a perspective view of a battery cell and a battery cell holder assembled together, according to an exemplary embodiment.

A battery cell holder formed in consideration of electrode terminals is described with reference to FIGS. 7 and 8. FIG. 7 illustrates a perspective view showing a battery cell holder according to another exemplary embodiment. FIG. 8 illustrates a perspective view showing a battery cell holder and a battery cell assembled together.

According to an exemplary embodiment, referring to FIG. 7, a battery cell holder 600e may include guides 620a and 620b that surround an insulating plate 610. The guide 620b may correspond to the terminal surface 16 of a battery cell 10. The guide 620b may be formed such that the height H1 is lower than the height H2 of the guides 620a by lowering the upper end of one side of the guide 620b. Referring to FIG. 8, when the battery cell 10 is seated in the battery cell holder 600e, the guide 620a may interfere with the electrode terminals 11 in accordance with the height. Accordingly, possibility of the interference with the electrode terminals 11 may be reduced by lowering the upper end of the guide 620b corresponding to the terminal surface 16. The guide 620a may also expose the vent 17 formed on the terminal surface 16. The guides 620a and 620b may be continuously formed around the insulating plate 610 such that the guides 620a and 620b are formed around the corners of the insulating plate 610.

Figure 9:
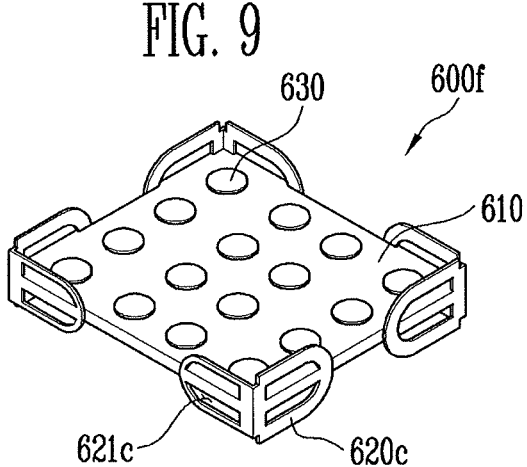
FIG. 9 illustrates a perspective view of a battery cell holder, according to an exemplary embodiment.

A battery cell holder that reduces weight is described with reference to FIG. 9. FIG. 9 illustrates a perspective view showing a battery cell holder according to another embodiment.

The guides 620 may have a structure that has, e.g., resistance against heat and/or external shock, and guides the battery cell 10. FIG. 9 illustrates a battery cell holder 600f that may include guides 620c that function as, e.g., guides for the battery cell 10. The guides 620c may be formed only around the corners of the insulating plate 610. In this regard, the guides 620c may each surround a corner of the insulating plate 610 such that the guides 620c are spaced apart along the periphery of the insulating plate 610. For example, each guide 620c may include a first portion that corresponds to one side of the insulating plate 610 and a second portion that corresponds to another side of the insulation plate 610 such that the guide 620c extends along a corner of the insulating plate 610. The guides 620c overlapping the terminal surface 16 may be spaced apart from the terminal electrodes 11 and the vent 17. The guides 620c may only function as a guide, e.g., guiding a proper placement, for a battery cell 10 in the battery module 100a. The battery cell holder 600f may include protrusions 630 formed on both sides of the insulating plate 610.

The length or the height of the guides 620c may not be limited. For example, the height of the guides 620c may be equal to or less than a height of the battery cell 10 seated in the guides 620c. The height of portions of the guides 620c that correspond to the terminal surface 16 of a battery cell 10 may be lower than the height of portions of the guides 620c that correspond to other sides of the battery cell 10.

Figure 10:
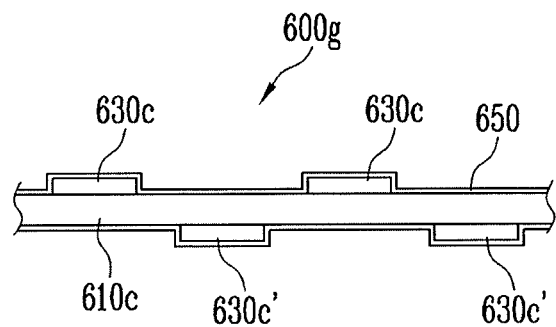
FIG. 10 illustrates a partial cross-sectional view of an insulating plate, according to an exemplary embodiment.

FIG. 10 illustrates a perspective view showing an embodiment of an insulating plate in a battery cell holder that may easily dissipate heat.

A battery cell holder 600g may include a metal plate 610c and an insulating layer 650 on protrusions 630c. The protrusions 630c may be formed on, e.g., directly on, the metal plate 610c. The insulating layer 650 may insulate battery cells 10. The plate 610c and the protrusions 630c may quickly transfer the heat produced from the battery cells 10 to the outside. Thus, it is possible to more quickly dissipate the heat from the inside.

The plate 610c and/or the protrusions 630c may be made of a metal, e.g., aluminum. The insulating layer 650 may be made by using hard anodizing coding. The hard anodizing coding may include a method of forming a layer by changing the surface of aluminum metal into alumina ceramic, using, e.g., an electrochemical method. The layer formed by hard anodizing coding may have corrosion resistance, abrasion resistance, and provide insulation.

Figure 11:
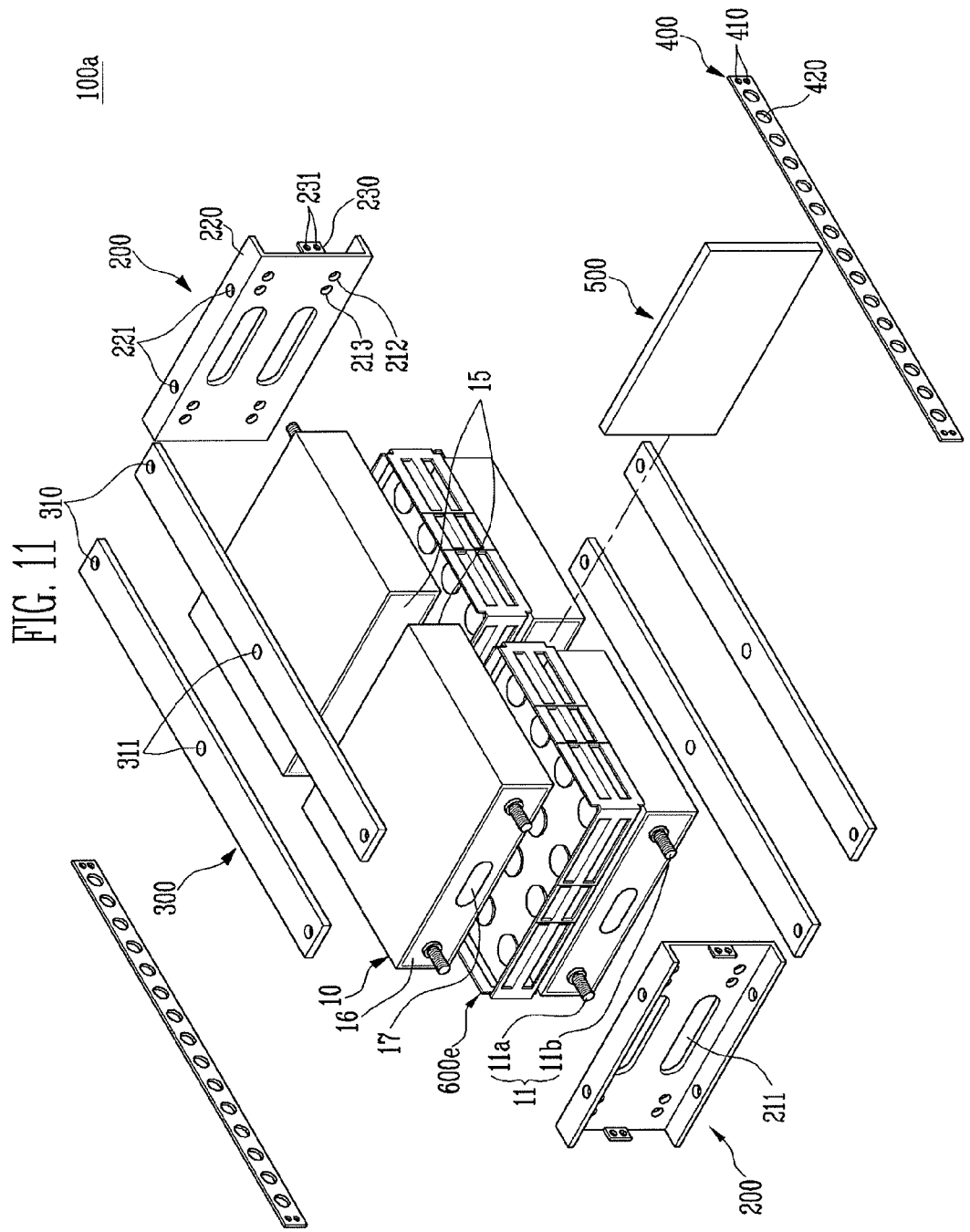
FIG. 11 illustrates an exploded perspective view of a battery module, according to an exemplary embodiment.
Figure 12:
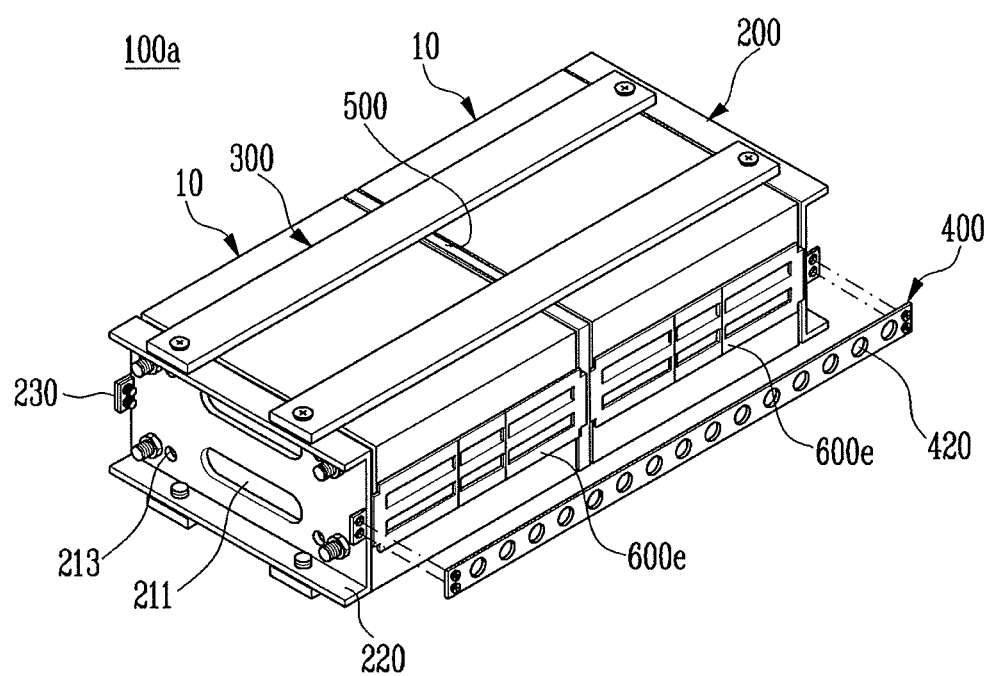
FIG. 12 illustrates a perspective view of the battery module shown in FIG. 11, as assembled, according to an exemplary embodiment.
Figure 13:
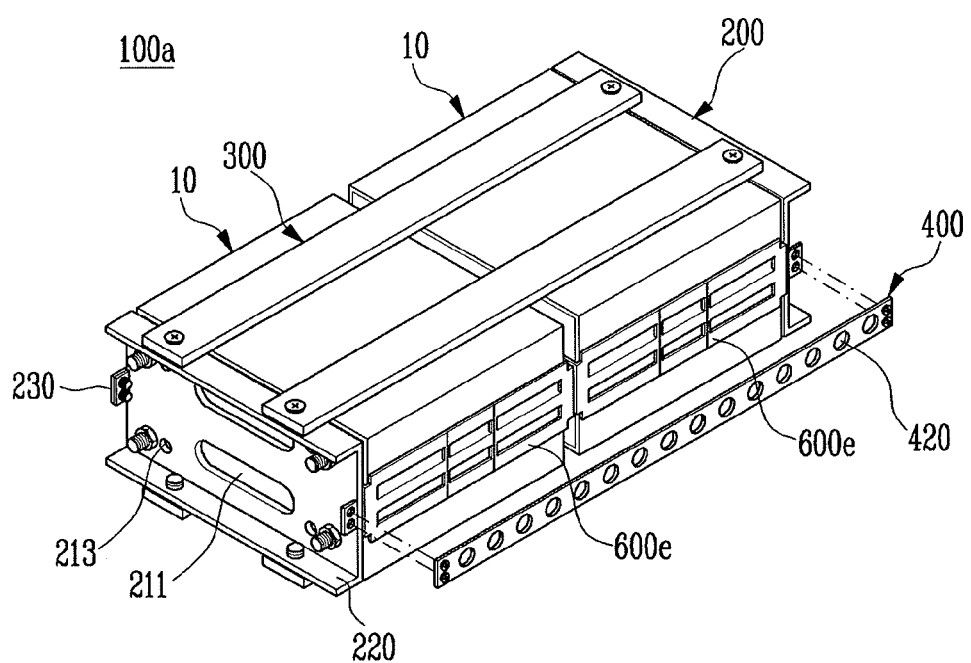
FIG. 13 illustrates a perspective view of an assembled battery module, according to an exemplary embodiment.

A combination relationship of a battery module 100a including a battery cell holder is described with reference to FIGS. 11, 12, and 13. FIG. 11 illustrates an exploded perspective view showing a battery module according to an exemplary embodiment. FIG. 12 illustrates a perspective view showing the battery module shown in FIG. 11 in an assembled state. FIG. 13 illustrates a perspective view of a battery module in an assembled state, according to an exemplary embodiment.

FIG. 11 illustrates the battery cell holder 600e in the battery module 100a according to an exemplary embodiment for ease of explanation. Other embodiments of a battery cell holder may be similarly including in the battery module 100a. The battery cell holder 600e may be an insulator between the battery cells 10 stacked as described above, e.g., between two battery cells 10 stacked on top of each other in a first direction. The battery cell holder 600e may improve, e.g., the fixing force between the two battery cells 10 and quickly discharges the heat produced from the two battery cells 10 to the outside.

FIG. 12 illustrates the exemplary battery module 100a shown in FIG. 11 in an assembled state in which two battery cells 10 are seated in each of the battery cell holders 600e. In the assembled state of the battery module 100a, the battery cell holders 600e may be adjacent to the side fixing members 400. For example, the battery cell holders 600e may include guides 620 that extend in a direction substantially parallel to the side fixing members 400. According to an exemplary embodiment, at least one of the guides 620 parallel to the side fixing members 400 may overlap the side fixing members 400.

Referring to FIG. 13, a battery module according to another embodiment is illustrated in a perspective view showing when the battery module 100a illustrated in FIG. 11 has been assembled without a vertical insulating member 500. The two battery cell holders 600e of pairs of battery cells 10 may contact each other, e.g., may be in direct contact with each other, without the vertical insulating member 500 therebetween. Since there is no vertical insulating member 500, the pairs of battery cells 10 may be horizontally adjusted and separated as much as the combined thicknesses of the guides 620 of the two battery cell holders 600e that are contacting each other. Therefore, the guides 620 of the battery cell holders 600e may act as an insulator for the pairs of battery cells 10 arranged in the second direction in the battery module 100a.

The other configuration and combination relationship are substantially the same as those of the transverse type of battery module described above.

Embodiments relate to providing a battery cell holder that may improve the fixing force between stacked battery cells and may easily discharge heat produced from the battery cells to the outside, and a battery module having the battery cell holder. The battery cell holder may improve the fixing force between the stacked battery cells and may easily discharge heat produced from the battery cells.

By way of summation and review, small mobile devices, such as mobile phones, can operate for a predetermined time with output and capacity of a single battery. Due to output and capacity demands, electric modules including a plurality of battery cells may be used to in order to operate electric vehicles and hybrid vehicle, which consume a large amount of electricity, with high power for a long period of time. The battery modules may be used by connecting a required amount of batteries in parallel or series in accordance with the output and capacity demands.

Embodiments, including the exemplary embodiments discussed above, relate to a battery cell holder and a battery module having the battery cell holder. Battery cells may have electrode terminals, a terminal surface with a vent exposed, and a bottom opposite to the terminal surface. At least two or more battery cells may be stacked in a battery array to form a battery module. A pair of battery cells may be disposed in a second direction, e.g., in a horizontal direction, such that the bottoms face each other and the pairs of battery cells may be stacked in a first direction that intersects the second direction, e.g., in a vertical direction. Further, an insulator may be disposed between the bottoms of the pair of battery cells. Fixing members may fix the battery cells in the battery array.

The battery cell holder may have a function of insulation and/or may protect and/or prevent a cell from separating. The battery cell holder may include an insulating plate, protrusions, and guides. The insulating plate may be disposed between two stacked battery cells and insulate them. The protrusions may be formed on both surfaces of the insulating plate and define predetermined spaces between the insulating plate and the battery cells. The guides may extend along a second direction, e.g., vertically, along the periphery of the insulating plate.

The battery cell holder may improve the fixing force between stacked battery cells and may easily discharge heat produced from the battery cells. Therefore, a battery module including the battery cell holder may have structural stability and may more easily dissipate heat in operation.

Example embodiments have been disclosed herein, and although specific terms are employed, they are used and are to be interpreted in a generic and descriptive sense only and not for purpose of limitation. In some instances, as would be apparent to one of ordinary skill in the art as of the filing of the present application, features, characteristics, and/or elements described in connection with a particular embodiment may be used singly or in combination with features, characteristics, and/or elements described in connection with other embodiments unless otherwise specifically indicated. Accordingly, it will be understood by those of skill in the art that various changes in form and details may be made without departing from the spirit and scope of the present invention as set forth in the following claims.

What is claimed is:

1. A battery module, comprising:
a first set of battery cells stacked in a first direction and a second set of battery cells stacked in the first direction, the first and second sets of battery cells being arranged in a second direction and facing in opposed directions relative to each other; and
at least one battery cell holder between adjacent battery cells in at least one of the first and second sets of battery cells stacked in the first direction, the battery cell holder including:
an insulating plate between the adjacent battery cells in the at least one of the first and second sets of battery cells stacked in the first direction, the insulating plate including a plurality of protrusions thereon, and
a plurality of guides protruding from edges of the insulating plate to extend in the first direction over the adjacent battery cells in overhanging relationship therewith,
wherein the plurality of protrusions:
are discontinuously and regularly distributed throughout the insulating plate so as to face side surfaces of the battery cells, and
contact side surfaces of the battery cells at spaced apart locations throughout an entirety of the side surfaces including central and peripheral portions thereof.

2. The battery module as claimed in claim 1, wherein the insulating plate is arranged in a plane coincident with the second direction.

3. The battery module as claimed in claim 1, wherein the insulating plate with the guides thereon has an overall rectangular shape for co-operation with prismatic battery cells.

4. The battery module as claimed in claim 1, wherein, in the at least one of the first and second sets of battery cells, a first surface of the insulating plate is adjacent to one battery cell and a second surface of the insulating plate is adjacent to another battery cell, the first surface and the second surface of the insulating plate being parallel to the second direction, and the plurality of guides protruding in the first direction intersecting the second direction.

5. The battery module as claimed in claim 1, wherein, in the at least one of the first and second sets of battery cells, the plurality of protrusions include upper protrusions facing a first surface of one adjacent battery cell and lower protrusions facing a second surface of another adjacent battery cell.

6. The battery module as claimed in claim 5, wherein the upper protrusions and the lower protrusions are arranged in a zigzag pattern such that the upper protrusions are in a non-overlapping relationship with the lower protrusions.

7. The battery module as claimed in claim 5, wherein, in the at least one of the first and second sets of battery cells, the upper protrusions contact the first surface of the one adjacent battery cell and the lower protrusions contact the second surface of the other adjacent battery cell.

8. The battery module as claimed in claim 5, wherein, in the battery cell holder:
the insulating plate includes a metal plate;
the upper and lower protrusions include a metal; and
insulating layers cover the metal plate, the upper protrusions, and the lower protrusions.

9. The battery module as claimed in claim 1, wherein the plurality of guides substantially completely surrounds the insulating plate.

10. The battery module as claimed in claim 1, wherein each guide of the plurality of guides includes a plurality of slots that expose sides of the adjacent battery cells.

11. The battery module as claimed in claim 10, wherein slots of the plurality of slots are spaced apart on each guide.

12. The battery module as claimed in claim 1, wherein the plurality of guides include an insulating material.

13. The battery module as claimed in claim 1, wherein one guide of the plurality of guides extends over terminal surfaces of the adjacent battery cells and has a lesser height than other guides of the plurality of guides.

14. The battery module as claimed in claim 1, wherein the insulating plate has a plurality of corners, the plurality of guides being spaced apart on the corners of the insulating plate.

15. The battery module as claimed in claim 1, wherein the at least one battery cell holder includes a first battery cell holder between the adjacent battery cells in the first set of battery cells and a second battery cell holder between the adjacent battery cells in the second set of battery cells.

16. The battery module as claimed in claim 15, wherein one guide in each of the first and second battery cell holders in the first and second sets of battery cells, respectively, are in abutting contact with each other.

* * * * *